(12) United States Patent
Hare (10) Patent No.: US 10,720,883 B2
(45) Date of Patent: Jul. 21, 2020

(54) APPARATUS AND METHOD FOR TESTING PERFORMANCE OF MULTI-JUNCTION SOLAR CELLS

(71) Applicant: Casey Patrick Hare, Santa Barbara, CA (US)

(72) Inventor: Casey Patrick Hare, Santa Barbara, CA (US)

(73) Assignee: Angstrom Designs, Inc, Santa Barbara, CA (US)

( * ) Notice: Subject to any disclaimer, the term of this patent is extended or adjusted under 35 U.S.C. 154(b) by 449 days.

(21) Appl. No.: 15/495,845

(22) Filed: Apr. 24, 2017

(65) Prior Publication Data

US 2018/0309404 A1  Oct. 25, 2018

(51) Int. Cl.
*H02S 50/15* (2014.01)
*F21S 8/00* (2006.01)
*F21Y 115/10* (2016.01)
*F21Y 113/13* (2016.01)

(52) U.S. Cl.
CPC .............. *H02S 50/15* (2014.12); *F21S 8/006* (2013.01); *F21Y 2113/13* (2016.08); *F21Y 2115/10* (2016.08)

(58) Field of Classification Search
None
See application file for complete search history.

(56) References Cited

U.S. PATENT DOCUMENTS

| | | |
|---|---|---|
| 3,247,367 A | 4/1966 | Rayces |
| 4,423,469 A | 12/1983 | Zerlaut |
| 4,641,227 A | 2/1987 | Kushuhara |
| 5,217,285 A | 6/1993 | Sopori |
| 5,623,149 A | 4/1997 | Kimer |
| 6,169,414 B1 | 1/2001 | Yoshino |
| 6,548,819 B1 | 4/2003 | Lovelady |
| 7,067,831 B2 | 7/2006 | Ahrens |
| 7,135,664 B2 | 11/2006 | Vornsand |
| 7,411,408 B2 | 4/2008 | Shimotomai |
| 7,514,931 B1 | 4/2009 | Shimotomai |
| 7,901,086 B2 | 3/2011 | Ripoll |
| 8,138,782 B2 | 3/2012 | Elgar |
| 8,198,821 B2 | 6/2012 | Shimotomai |
| 8,239,165 B1 | 8/2012 | Young |
| 8,558,536 B2 | 10/2013 | Shimotomai |
| 8,579,446 B2 | 11/2013 | Anton |
| 8,581,572 B2 | 11/2013 | Cravey |
| 8,736,272 B2 | 5/2014 | Linden |
| 8,960,930 B2 | 2/2015 | Li |
| 9,063,006 B2 | 6/2015 | Jungwirth |
| 9,250,122 B2 | 2/2016 | Serreze |

(Continued)

Primary Examiner — Paresh Patel (57) ABSTRACT

A test apparatus for analyzing performance of a multi-junction solar cell can include a plurality of light source groups, each light source group including three or more light sources distributed over a substrate. Each sub-cell of the solar cell is associated with at least one of the light source groups, and each light source group primarily photoexcites the sub-cell of the light source group with which it is associated. The intensities of the various light source groups can are adjusted such that an output current of each of a plurality of calibration standards is within 2% of a predetermined current value. The test apparatus can then be used to test performance of the multi-junction solar cell.

20 Claims, 6 Drawing Sheets (56) References Cited

U.S. PATENT DOCUMENTS

| | | |
|---|---|---|
| 9,410,669 B2 | 8/2016 | Jungwirth |
| 9,431,954 B2 | 8/2016 | Shr |
| 2004/0020529 A1 | 2/2004 | Schutt |
| 2008/0298043 A1 | 12/2008 | Shimotomai |
| 2009/0261802 A1 | 10/2009 | Askins |
| 2009/0261810 A1 | 10/2009 | Askins |
| 2009/0279277 A1 | 11/2009 | Jungwirth |
| 2011/0241549 A1* | 10/2011 | Wootton .............. G01J 1/08 |
| | | 315/117 |
| 2011/0241719 A1* | 10/2011 | Shr .................. H02S 50/10 |
| | | 324/761.01 |
| 2012/0068729 A1 | 3/2012 | Haslauer |
| 2012/0181933 A1* | 7/2012 | Ma .................. H01L 27/3281 |
| | | 315/121 |
| 2013/0063174 A1 | 3/2013 | Ooto |
| 2013/0069687 A1* | 3/2013 | Ooto ................ F21S 8/006 |
| | | 324/761.01 |
| 2013/0294045 A1 | 11/2013 | Morgenbrod |
| 2013/0328587 A1 | 12/2013 | Linden |
| 2017/0141726 A1* | 5/2017 | Jungwirth .......... F21S 8/006 |
| 2017/0146204 A1 | 5/2017 | Di Ttrapani |

* cited by examiner

APPARATUS AND METHOD FOR TESTING PERFORMANCE OF MULTI-JUNCTION SOLAR CELLS

TECHNICAL FIELD

The current disclosure relates to solar cell measurement systems and to solar simulators.

BACKGROUND

Solar energy generation has been a growing field for decades and continues to become more important for power production both on earth and in space. Solar simulators used in characterization and testing of solar cells produce light that represents sunlight (i.e., mimics the emission spectrum of the sun). Measurement systems that use solar simulators are needed in order to understand and validate solar cells in both research and manufacturing. Natural sunlight is rarely used for testing solar cells because it is variable, weather dependent and rarely of the appropriate intensity and spectrum to be used as a standard.

The construction and use of a solar simulator varies depending on the needs of the solar cells being tested. The original solar simulators were used to test simple, single junction solar cells. A junction is a semiconductor region that produces electrical carriers from incident light. Solar cells can be produced that have one junction or that have more than one junction, with the multi-junction solar cells typically having higher performance and higher cost. Although the vast majority of solar cells produced today use a semiconductor junction, solar cells do not need to be made of semiconductor material, as some solar cells are made from dyes, plastics or organic materials. The active sub-cell of a solar cell is called a junction or a sub-cell. A solar cell containing multiple sub-cells is called a multi-junction solar cell and a solar cell containing a single sub-cell is called a single junction solar cell. As used herein, in reference to solar cells, the term "junction", "sub-cell", "junction of a solar cell" or "sub-cell of a solar cell" refers to any region of a solar cell that accepts some range of the incident light spectrum and produces electrical carriers from that incident light. Solar cell testing can be for single solar cells or multiple solar cells that are electrically connected together, sometimes called strings or circuits of strings. As used herein, in reference to testing solar cells, the term "solar cell" or "solar cells" can refer to an individual solar cell, a group of solar cells that are not electrically connected together or a group of solar cells that are electrically connected together.

Solar cells for use on earth are typically single junction, and the junction uses doped silicon as the material. Solar simulators for these cells have been developed over many decades, and a variety of products are available. Many of the early terrestrial solar simulators used a xenon lamp as the light source because of the high output power and the spectral similarity between the sun spectrum and xenon output spectrum. Two groups of simulators emerged. With one group, continuous simulators, a relatively small area (typically approximately 1 square foot or less) is illuminated with a continuous beam of light. With the other group, pulsed simulators, a large area (typically approximately 10 square feet or more) is illuminated with a short pulse of light.

Because single junction cells produce current for any light that falls into the acceptance spectrum of the cell, almost any light can be used in solar simulation to illuminate single junction cells. However, solar simulators with spectra that deviate from actual sunlight produce output errors, so the figure of merit for single junction simulators is how well the light output matches a reference solar spectrum. One of the most common reference spectra for terrestrial single junction cells is air mass 1.5, or AM1.5, that represents (i.e., matches) an average sun spectrum and intensity for mid-latitude locations on Earth's surface. This concept of matching a spectrum, AM1.5 or otherwise, is an important element of simulators for testing single-junction, terrestrial solar cells.

The concept of spectral matching was carried forward into other terrestrial solar simulators, including those that do not use lamps and those configured for testing solar cells that have multiple junctions.

Another simulator, which can be used to test terrestrial solar cells uses LEDs instead of lamps as light sources, but still utilizes spectral matching. The terrestrial LED simulators use many different wavelength LEDs, often with overlapping wavelengths, to approximate a piece-wise match of a reference spectrum, such as AM1.5.

Due to the need for increased power, solar cells for space evolved from single junction devices into multi-junction devices. The solar simulators also evolved to support the added junctions. The first space solar simulators were xenon lamps, just like terrestrial simulators. Multiple junctions added additional demands on the simulator, as spectral matching could not be achieved to a high enough performance to give the needed accuracy when testing multi-junction solar cells. The industry created isotype calibration cells to solve this problem. As used herein, "isotype calibration cells" or "isotypes" are multi-junction cells that have all sub-cells electrically inactive except for one. They are intended to be physically identical to a full cell, but with only one working sub-cell. These isotypes can be calibrated by flying them above the atmosphere, exposing them to sunlight, and recording the output current. For some flights, correction factors are also applied. These isotypes can then be used to calibrate solar simulators. Many calibration standards have not actually been flown, but are cloned from calibration cells that have been flown; however, the use is the same.

Given the need to match solar cells with multiple sub-cells, the solar simulators for multi-junction space cells evolved. They still used lamps such as Xenon to match the solar spectrum, but they added adjustment mechanisms to tweak the output spectrum to adjust the amount of current to various isotypes. These adjustments were often highly coupled, but could in some cases be suitably performed by a skilled operator.

Methods to adjust the output of a xenon bulb to give adjustability to the xenon spectrum include adding filters and/or mirrors, often times on a motorized stage. These methods add slight adjustability to the existing lamp (typically xenon lamp) spectrum. Additionally, solar simulators designed for testing solar cells to be used in space are calibrated to the spectrum of light emitted by the sun without passing through any earth atmosphere. This spectrum is commonly referred to as air mass zero or AM0. However, as with solar simulators used to test cells utilized in terrestrial applications, the optical output spectrum of solar simulators designed for testing of cells used in space applications are still configured to match a reference spectrum (which in the case of space applications is AM0).

Like the terrestrial simulators, space simulators have also been formed with LEDs as light emitters. However, the LEDs are still collectively configured to recreate (i.e., match) the AM0 emission spectrum. These LEDs can also perform the function of the mirrors and filters, which is to add slight adjustability to the existing xenon spectrum. There are also systems that attempt to replace the xenon lamp with banks of LEDs, while trying to match the AM0 spectrum.

In addition to using spectral matching, spatial uniformity across the illuminated area is also a figure of merit of a solar simulator. Many methods have been used to achieve good spatial uniformity. Continuous, small area simulators use beam combining methods including filters, mirrors and splitters. Large area, pulsed simulators place the source far from the sample and also use filters and mirrors. One embodiment uses a plate of glass with opaque, filter lines of varying density between the source and the sample solar cell. Simulators with multiple sources can vary the intensity between the sources to improve spatial uniformity.

Once under illumination, may different measurements can be run on the cell. A source measurement unit, or SMU, is well known to one skilled in the art. Many types of tests can be performed, but highly common tests include taking a current versus voltage curve, referred to as an I-V curve, or measuring the short circuit current of the cell (Isc). The I-V curve contains many metrics of interest about the cell under test, including open circuit voltage (Voc), short circuit current (Isc), fill factor (FF), series resistance (Rseries), shunt resistance (Rshunt) and the maximum power point, which is the maximum power voltage (Vmp) and the maximum power current (Imp).

In order to compare simulators, the industry has developed a number of standards for measuring solar simulator performance. These standards include American ASTM E 927-05, European IEC 60904-9 Edition 2 (2007) and Japanese JIS C 8912 standards. These three standards are subtly different, but they each specify requirements for spectral matching, spatial uniformity and temporal stability. Spectral matching is typically specified by the amount of power put into each of approximately 10 spectral bands. If the specified amount of power, plus or minus 10% is put into each of the bands then a simulator is given the highest rating, Class A. For spatial uniformity, the highest rating, Class A, is typically 2% across the illumination plane of interest. For temporal stability the highest rating, Class A, is typically 2%. A simulator that meets the highest standard in all 3 categories, spectral matching, spatial uniformity and temporal stability is called Class AAA.

SUMMARY

Described herein are methods of performing solar simulation for multi-junction solar cells and apparatuses for performing the same. In accordance with one embodiment, invention test apparatus contains a multitude of light sources in 2 or more groups. Each group is designed to primarily illuminate one of the sub-cells of the multi-junction cell. These light source groups are adjusted to match the current output of the sub-cells rather than to match a reference spectra. That is, rather than re-creating a reference optical spectrum such as the sun's spectrum, each light source group can be configured to primarily drive a single sub-cell of the multi-junction cell, and can therefore have a relatively narrow emission spectrum which is in a wavelength/frequency range which is absorbed by its associated sub-cell. The intensities of each light source group can then be adjusted such that the output current of the sub-cells match that which would be measured when the solar cell is exposed to the reference spectrum which it is designed for (e.g., the solar spectrum at a given location). Furthermore, the light sources provide a spatial uniformity across the cell that is comparable to other solar simulation methods.

Another way to state this is that the embodiment provides enough light source types to adjust the current to the target current production of a reference spectrum for each sub-cell and also provides enough light sources of each type to achieve good spatial uniformity within each sub-cell.

Some test apparatuses include more light source types (i.e., more light source groups) than there are sub-cells in the multi-junction cell. In this case, different light source groups that primarily illuminate the same sub-cell can be used together to match current output and spatial uniformity for the given sub-cell. Alternatively, some of the additional light sources or light source groups need not be used.

Another embodiment compensates for differences in current output from multi-junction cells between the solar simulator and the reference spectrum. Given that these differences are known for a given set of light sources, the target output current of the isotypes is adjusted. The adjusted target current output is used in the current matching method. The method is used with the adjusted values, and the current output differences are compensated for. In many configurations of light sources, isotypes, and full cells, this method is not used, as the differences are small.

Single-junction solar cells do not contain multiple sub-cells, so solar simulators used to test these cells do not need many of the configurations and adjustments described for many of the systems and methods herein.

Typical multi-junction solar simulators emphasize spectral matching and spatial uniformity control. These simulators attempt to closely match a reference spectrum, such as AM0. By matching the spectra, these simulators attempt to eliminate any spectral mismatch between solar simulation and reference spectra. However, matching a continuous spectrum with discrete light sources such as LEDs can be difficult and requires many different types of LEDs at very close wavelengths to one another. Some of the LEDs used for this coverage can have low power output or be very costly.

Some solar simulators for multi-junction solar cells have used Xenon bulbs in an attempt to obtain a good spectral match. Small amounts of spectral adjustivity using filters and mirrors can be performed to further improve the spectral match. These embodiments typically rely on the primary Xenon bulb for all power, spectrum, adjustment and spatial uniformity. These added adjustment features are often highly coupled to one another making adjustment difficult and time-consuming even for a skilled operator. Also, the addition of more mechanical components increases cost and complexity while decreasing reliability, repeatability and robustness.

DESCRIPTION OF DRAWINGS

Like numbers in the drawings represent like elements.

DETAILED DESCRIPTION

Described herein are test apparatuses for analyzing performance of multi-junction solar cells, and associated methods for performing the analyses. The test apparatuses generally each include an array of light sources distributed over a substrate (e.g., a printed circuit board or PCB). The light sources are divided into light source groups, with each light source group including a plurality of light sources distributed over the substrate. Each light source group utilizes light sources having a similar (or substantially the same) emission spectrum. For example, a first light source group can include LEDs which primarily emit light at a first wavelength, a second light source group can include LEDs which primarily emit light at a second wavelength greater than the first wavelength, and a third light source group can include LEDs which primarily emit light at a third wavelength greater than the second wavelength. As such, each of the light source groups has an emission spectrum that is different from each of the other light source groups, and an emission spectrum of the test apparatus is substantially different from the emission spectrum for which the solar cell is designed. The light sources are distributed over the substrate in a pattern that causes the emission spectrum to be substantially uniform over the surface of the solar cell being analyzed and tested.

Figure 1:
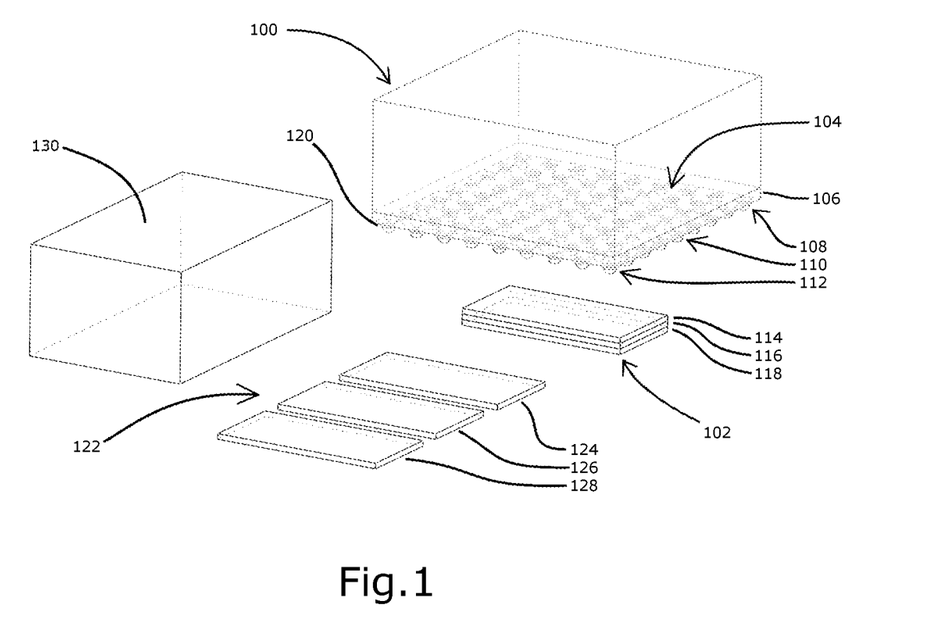
FIG. 1 shows an embodiment of the disclosure with a 3-junction solar cell, 3 light source type groups and 3 calibrated isotypes.

In order to analyze and test a multi-junction solar cell, the test apparatus is first positioned over the solar cell such that a separation between the test apparatus 100 and the solar cell 120 is in a range of about 10 millimeters to 2000 millimeters, for example in a range of 10 to 1500 millimeters, 10 to 1000 millimeters, 10 to 900 millimeters, 10 to 800 millimeters, 10 to 700 millimeters, 10 to 600 millimeters, 10 to 500 millimeters, 10 to 400 millimeters, 10 to 300 millimeters, 10 to 200 millimeters, or 10 to 100 millimeters. Each of the light sources shine light on the solar cell with an intensity corresponding to a predetermined calibrated value, which is determined by calibrating the test apparatus using methods described below. The output current-voltage characteristics of the illuminated solar cell are then measured and compared to a predetermined calibrated value.

As previously described, the test apparatuses herein each contain a plurality of light sources divided into two or more light source groups. Each light source group utilizes light sources having a similar (or substantially the same) emission spectrum and is designed to primarily illuminate one of the sub-cells of the multi-junction cell. These light source groups are adjusted to match the current output of each of the sub-cells, rather than to match a reference spectra. That is, rather than re-creating a reference optical spectrum, such as the sun's spectrum, for which the solar cell is configured for use with, each light source group is configured to primarily drive a single sub-cell of the multi-junction cell, and can therefore have a relatively narrow emission spectrum which is in a wavelength/frequency range that is absorbed by its associated sub-cell. The intensities of each light source group can then be adjusted such that the output current of the sub-cells match that which would be measured when the solar cell is exposed to the reference spectrum for which it is designed (e.g., the solar spectrum at a given location). As such, the emission spectrum of the test apparatus can be substantially different from the emission spectrum for which the solar cell is designed (e.g., AM0).

As an example, consider a solar cell comprising three sub-cells. A test apparatus configured to analyze and test its performance can include at least three groups of light sources. The first group of light sources emit light in a frequency range that causes the emitted light to be primarily absorbed by the first sub-cell, the second group of light sources emit light in a frequency range that causes the emitted light to be primarily absorbed by the second sub-cell, and the third group of light sources emit light in a frequency range that causes the emitted light to be primarily absorbed by the third sub-cell. Additional light source groups can also be provided which are each configured to primarily illuminate only one of the sub cells. As such, some or all of the sub-cells can optionally be associated with (e.g., primarily illuminated by) more than one light source group, provided that each sub-cell is associated with at least one light source group.

Prior to testing the solar cells, the level of illumination (e.g., intensity and/or illumination pattern) of each of the light source groups of the test apparatus is adjusted to a value which causes each of the sub-cells to output substantially the same current that would be ouput by the sub-cell while the solar cell is illuminated by the optical spectrum for which it is designed. For example, for a multi-junction solar cell that is designed to be illuminated by the AM0 spectrum during operation, each sub-cell of the solar cell is configured to independently output a predetermined current while the solar cell is illuminated by AM0. The illumination (e.g., intensity) that each of the light source groups is adjusted to is that which independently causes the sub-cells to output this same predetermined current.

Calibration of the light source groups to achieve the desired illumination levels can be achieved several ways. For example, in some implementations, a set of calibration standards (e.g., isotypes) are provided, where the number of isotypes is the same as the number of sub-cells of the solar cell, and each isotype corresponds to one of the cells of the solar cell. The isotypes are calibrated such that the output current of each isotype under illumination by the desired spectrum is known. For example, when the desired spectrum is AM0, each isotype can be flown to a position where it is illuminated by AM0, where the output current under illumination by AM0 is measured.

The test apparatus can then be calibrated by performing the following steps. The light sources are turned on and left on for the entire test. Each isotype of the solar cell is consecutively illuminated by the test apparatus by positioning the test apparatus over the isotype. The separation between the test apparatus and each isotype during testing can be in one of the ranges previously listed. The light sources for each light source type are illuminated relative to one another in a pattern that gives relatively even illumination over the test plane (i.e., the surface of the isotype) for each light source group. The test apparatus is first positioned to illuminate a calibrated isotype top cell (i.e., the isotype corresponding to the top sub-cell of the associated solar cell), and the light source group(s) primarily configured to photoexcite the top sub-cell of the solar cell is/are iteratively adjusted, by turning the light sources in the group up and down, until the isotype outputs a current within 2% of the calibration current. The test apparatus is then moved to illuminate the second isotype (i.e., the isotype corresponding to the sub-cell located directly below the top sub-cell), and the light source group(s) primarily configured to photoexcite the second sub-cell of the solar cell is/are iteratively adjusted, by turning the light sources in the group up and down, until the second isotype outputs a current within 2% of the calibration current. The current matching processes described above are iteratively repeated for each isotype (in some cases multiple times for each isotype) until all isotypes are outputting current equal to their respective calibration current to within 2% (e.g., to within 1.5% or 1%). The test apparatus is then moved to illuminate the solar cells under test.

Other implementations for calibrating the light source groups involve using a calibrated cell with substantially the same design and with the same number of sub-cells as the solar cell under test, wherein each of the sub-cells of the calibrated cell is associated with at least one of the light source groups, and each light source group is configured to primarily photoexcite one of the sub-cells of the calibrated cell. The calibrated cell is one for which the output current of the solar cell while each sub-cell is independently excited is known (e.g., pre-determined). To independently excite a sub-cell of the calibrated cell, the light source groups associated with the sub-cell are illuminated at or near their intended levels (e.g., at a first illumination level), while all of the other sub-cells of the calibrated cell are simultaneously illuminated by their associated light sources at a second illumination level substantially greater than an illumination level that each of the other sub-cells are configured to receive. In this way, current output by the calibration cell is limited by the sub-cell illuminated at the first illumination level, and therefore corresponds to the output current of that sub-cell. For each sub-cell of the calibration cell, the corresponding light source groups are adjusted until the currents of each sub-cell while the sub-cell is independently excited are within 2% (e.g., within 1.5% or 1%) of their calibrated value. The test apparatus is then moved to illuminate the solar cells under test.

Test apparatus configurations such as those described above and further illustrated in the examples below have been shown to be able to accurately characterize multi-junction solar cells having greater than three junctions (e.g., at least four, at least five, or at least six junctions), and can be readily scaled to test cells with even more than six junctions. Conventional solar simulators which aim to match a reference solar spectrum to date have only been able to accurately characterize cells with up to three junctions. Furthermore, test apparatus configurations such as those described herein can be formed without many of the additional optical elements used in conventional solar simulators (e.g., mirrors, filters, diffusers or other additional components), thereby simplifying the design and calibration procedures and reducing cost. Additionally, because of the simplification in design and operation afforded by the test apparatuses herein, a much higher level of automation and efficiency can be achieved. Specifically, calibration of the test apparatus and subsequent testing of a solar cell can be completed in several minutes, as compared to several hours for conventional solar simulators and their associated operation procedures. This capability was unexpected, and enables scientific studies and analyses that were not previously possible.

In some cases, assembly of any of the test apparatus described herein is carried out by a first party (e.g., an assembler or engineering design firm), whereas calibration of the test apparatus and/or testing and analysis of the solar cells is carried out by a second party (e.g., a manufacturer of the solar cells). Alternatively, the assembly and calibration of the test apparatus can be carried out by a first party (e.g., an engineering design firm), and testing and analysis of the solar cells is carried out by a second party (e.g., a manufacturer of the solar cells). In other words, there can be multiple parties involved in assembly, calibration, and/or use of the test apparatuses described herein.

Accordingly, a first party which manufactures and assembles the test apparatus can provide instructions to a second party which calibrates the apparatus and performs testing on the solar cells on how to perform the above steps. For example, a first party can instruct the second party to position the test apparatus over a calibration standard or calibrated cell, thereby causing the test apparatus to be positioned over the calibration standard or calibrated cell. Or, the first party can instruct the second party on how to adjust illumination levels of the light sources while calibrating the test apparatus, thereby causing the intensities of the light sources to be adjusted. Or, the first party can instruct the second party on how to utilize the test apparatus to perform steps necessary to test solar cells (e.g., positioning the test apparatus over the solar cells and measuring current-voltage characteristics while the solar cells are illuminated by the test apparatus), thereby causing the test apparatus to be positioned over the solar cell, causing the solar cell to be illuminated by the test apparatus, and causing current-voltage characteristics of the solar cell to be measured. Such instructions can, for example, be provided in writing included in a purchase order or within packaging of the test apparatus, or alternatively can be provided in oral or written communication between the first and second parties.

As such, as used herein, the act of positioning a test apparatus over a calibration standard or other cell also includes directing another party to position the test apparatus over the calibration standard or other cell, thereby causing the test apparatus to be positioned over the calibration standard or other cell. Furthermore, as used herein, the act of adjusting illumination levels of light sources also includes directing another party to adjust illumination levels of light sources, thereby causing the illumination levels of the light sources to be adjusted.

Test apparatuses and corresponding test methods described herein are further illustrated by the following examples, which are not to be construed as limiting this disclosure in scope or spirit to the specific procedures herein described. It is to be understood that the examples are provided to illustrate certain embodiments and that no limitation to the scope of the disclosure is intended thereby. It is to be further understood that resort may be had to various other embodiments, modifications, and equivalents thereof which may suggest themselves to those skilled in the art without departing from the spirit of the present disclosure and/or scope of the appended claims.

A first test apparatus 100 for analyzing performance of a multi-junction solar cell 102 is illustrated in FIG. 1. As seen in FIG. 1, the test apparatus 100 includes an array of light sources 104 distributed over a substrate 106. The light sources are divided into groups, with each group including a plurality of light sources distributed over the substrate. Each group utilizes light sources having a similar (or substantially the same) emission spectrum. For example, a first group 108 can include LEDs which primarily emit light at a first wavelength, a second group 110 can include LEDs which primarily emit light at a second wavelength greater than the first wavelength, and a third group 112 can include LEDs which primarily emit light at a third wavelength greater than the second wavelength. As such, each of the light source groups has an emission spectrum that is different from each of the other light source groups. As described in more detail below, in order to test the performance of the solar cell 102, the test apparatus 100 is positioned over the solar cell such that a separation between the test apparatus and the solar cell is in a range of about 10 millimeters to 2000 millimeters, each of the light sources shine light on the solar cell with an intensity corresponding to a predetermined calibrated value, and the output current of the solar cell is measured and compared to a predetermined calibrated value.

The solar cells 102 under test are upright, metamorphic, 3-junction solar cells with the top sub-cell 114 made from Indium Gallium Phosphide, the middle sub-cell 116 made from Indium Gallium Arsenide and the bottom sub-cell 118 made from Germanium. The wavelengths and energy levels of the band gaps of the sub-cells in this cell are approximately 670 nm (1.9 eV), 885 nm (1.4 eV) and 1850 nm (0.7 eV). This test uses calibrated isotypes of the same technology as the test cells, as further described below.

The substrate 106 is made using printed circuit board technology. A light source array 104 on the substrate is an array containing approximately 300 LEDs of 3 different types arranged over an area greater than the area of the test cells. The 3 different light source types are similar (e.g., all are LEDs), except the emission wavelengths are 430 nm, 810 nm and 970 nm respectively. Each LED has its own small lens 120 which shapes the output beam viewing half angle to approximately plus or minus 35 to 50 degrees. Each of the LEDs in the apparatus are individually controlled by LED drive electronics. In this configuration, the light from the 430 nm LED produces more current in the top sub-cell than that of any of the other light source types. As used herein, if the light from a given light source group produces more current in a given sub-cell than any other light source type, we will say that the light source "primarily illuminates" that sub-cell. As such, the 430 nm LED group 108 primarily illuminates and photoexcites the top sub-cell. Similarly, the 810 nm LED group 110 primarily illuminates and photoexcites the middle sub-cell and the 970 nm LED group 112 primarily illuminates and photoexcites the bottom sub-cell.

Prior to testing of the solar cell 102, the test apparatus 100 is calibrated by performing the following tests on a set of calibrated isotypes 122. The calibration isotypes are each isotypes of the sub-cells of the solar cell 102. For the solar cell 102 of FIG. 1, because the solar cell 102 includes 3 sub-cells, the calibration tests are performed on 3 isotypes 122, where each of the 3 isotypes has one active sub-cell corresponding to one of the 3 sub-cells, and each sub-cell of the solar cell has 1 isotype with which it is associated.

Each isotype of solar cell 102 is consecutively illuminated by the test apparatus 100 as follows. The light sources 104 are turned on and left on for the entire test. In the example shown in FIG. 1, the spacing between the apparatus and the isotypes/cells is approximately 40 mm. The light sources for each light source type are illuminated relative to one another in a pattern that gives relatively even illumination over the test plane (i.e., the surface of the isotype) for each light source type. The test apparatus 100 is positioned to illuminate a calibrated isotype top cell 124 (i.e., the isotype corresponding to the top sub-cell of the solar cell 102) and the 430 nm LEDs 108 (which primarily photoexcite the top sub-cell of the solar cell 102) are iteratively adjusted, by turning all light sources in the group up and down together, until the isotype outputs a current equal to the calibration current to within 1%. The apparatus 100 is then moved to illuminate the middle isotype 126 and the 810 nm LEDs 110 are adjusted until isotype output current matches the middle isotype calibration current to within 1%. The apparatus 100 is then moved to illuminate the bottom isotype 128 and the 970 nm LEDs 112 are adjusted until isotype output current matches the bottom isotype calibration current to within 1%. The processes of matching is iteratively repeated until all 3 isotypes are outputting current equal to their respective calibration current to within 1%.

The apparatus is then moved to illuminate the solar cells 102 under test. The cells under test are attached to a standard source measurement unit 130 and an I/V curve is extracted for each cell and solar cell string of interest. The I/V curve shows many metrics about the cell: short circuit current, open circuit voltage, maximum power point, fill factor, series resistance, shunt resistance and more. These metrics define the efficiency, performance and health of the cell.

Finally, the apparatus is moved to illuminate each of the calibrated isotypes one more time. The current of each isotype is measured, without any changes to LED illumination. The purpose of this final test is to record the calibration value after testing, so any changes in solar simulator illumination over the course of testing is known. The light sources may be turned off if testing is complete or they may be left on if testing will continue.

Figure 2:
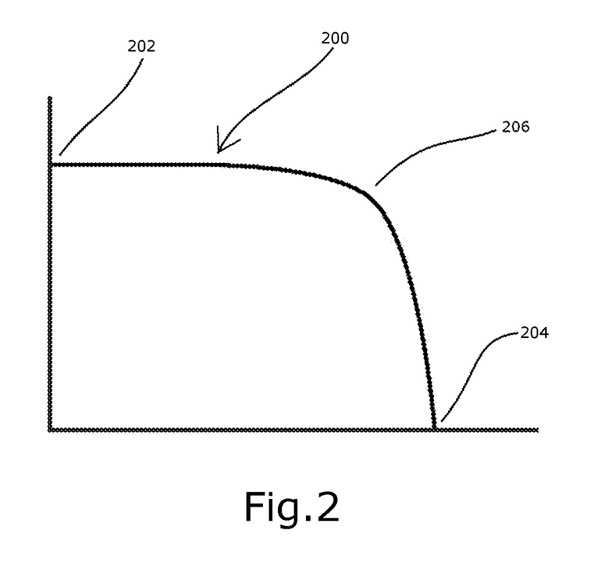
FIG. 2 shows an I-V curve and some of the named metrics of the curve

The apparatus produces I-V curves that are substantially identical to those produced under the AM0 spectrum or under the spectrum of a solar simulator that attempts to match the AM0 spectrum. This is an unexpected result as it is not obvious that the narrow spectral peaks of the 3 LEDs would produce the same output as illumination under broader, AM0-like spectra. All metrics of merit in the I-V curve, including short circuit current, open circuit voltage, maximum power point, fill factor, series resistance and shunt resistance match the AM0-like result provided the apparatus has (i) appropriately matched the isotype output current, (ii) good spatial uniformity across the test area and (iii) the temperature of the test cell is similar to the AM0-like test. It is not obvious that making a light field by matching Isc of the sub-cells using light that does not match a reference spectrum would give an I-V curve that matches the I-V curve measured from the representative spectra. It is particularly not obvious that the metrics of the I-V curve match, including many parameters that are not current measurements, such as open circuit voltage, fill factor, max power point, series resistance and shunt resistance.

Figure 3:
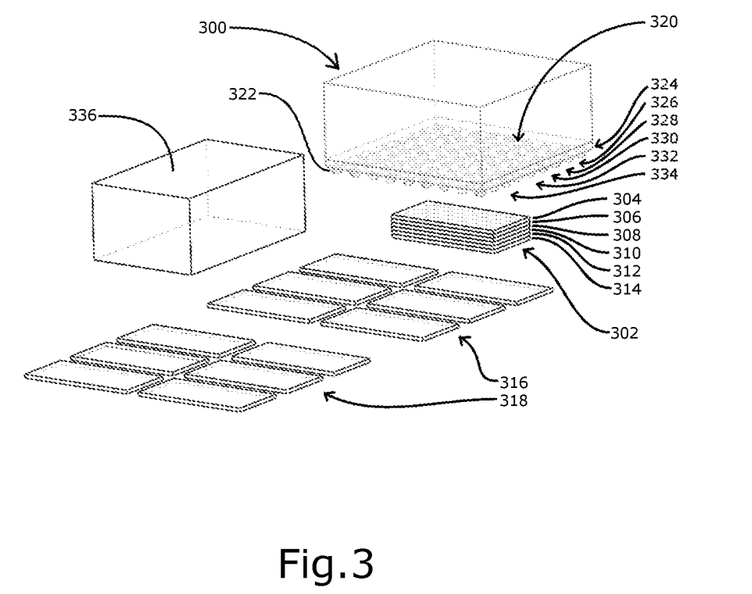
FIG. 3 shows an embodiment of the disclosure with 6-junction solar cells, 6 light source type groups and 6 calibrated isotypes.

An additional embodiment of the disclosure is illustrated in FIG. 3. The test apparatus 300 is shown. The solar cells under test 302 are inverted, metamorphic, 6-junction solar cells with the top sub-cell 304 made from Aluminum Gallium Indium Phosphide, the middle sub-cells made from Aluminum Gallium Arsenide 306, Gallium Arsenide 308, Indium Gallium Arsenide 310, and Indium Gallium Arsenide 312, respectively, and the bottom sub-cell 314 made from Indium Gallium Arsenide. The wavelengths and energy levels of the band gaps of the sub-cells in this cell are approximately 600 nm (2.1 eV), 710 nm (1.7 eV), 870 nm (1.4 eV), 1100 nm (1.1 eV), 1400 nm (0.9 eV) and 1850 nm (0.7 eV).

This test uses calibrated isotypes of a different technology 316 as the test cells. Prior to testing a solar simulator was calibrated using isotypes from the 6-junction technology under test 318. The calibrated light source was moved over each of 6 isotypes of a different technology type than the device under test and the output current was measured. This measured output current is used as the target current for calibration, enabling the different-technology isotypes 316 to be used for this test.

The light source array 320 is an array containing approximately 1000 LEDs of 6 different types, each type corresponding to one of the sub-cells of the solar cell, spread over an area greater than the area of the test cell. The 6 different light source types are similar (e.g., all are LEDs), except the emission wavelengths are 470 nm, 630 nm, 850 nm, 940 nm, 1200 nm, and 1500 nm, respectively. Each LED has its own lens 322 which shapes the output beam viewing half angle to approximately plus or minus 15 to 30 degrees. The nearest 4 LEDs to one another of the same light source type are controlled together in a group by LED drive electronics, so there are 4 times fewer electronic drive channels as there are LEDs. In this configuration, each LED type primarily illuminates only one sub-cell: the 470 nm LED group 324 primarily illuminates the top sub-cell, the 630 nm LED group 326 primarily illuminates the second sub-cell, the 850 nm LED group 328 primarily illuminates the third sub-cell, the 940 nm LED group 330 primarily illuminates the fourth sub-cell, the 1200 nm LED group 332 primarily illuminates the fifth sub-cell and the 1500 nm LED group 334 primarily illuminates the bottom sub-cell.

The light sources turn on for a pulse lasting 800 milliseconds and are off for 8 seconds for the duration of this test. Data is collected during the last 300 milliseconds when the light sources are on. The spacing between the apparatus and the isotypes and cells is approximately 80 mm. The light sources for each light source type are illuminated relative to one another in a pattern that gives relatively even illumination over the test plane for each light source type. The apparatus is positioned to illuminate each calibrated isotype in sequence and isotype current is measured. After all isotypes have been measured, the measured isotype current is compared to the reference current for each isotype and all light sources are adjusted at the same time. This process of measuring all isotypes and then adjusting all light sources is performed iteratively until each isotype outputs a current equal to the calibration current to within 0.5%.

The apparatus 300 is moved to illuminate the cells under test 302. The cells under test are attached to a source measurement unit 336 and an I-V curve is extracted for each cell and solar cell string of interest.

Finally, the apparatus is moved to illuminate each of the calibrated isotypes one more time. The current of each isotype is measured, without any changes to LED illumination. The light sources may be turned off if testing is complete or they may continue to be pulsed for 800 milliseconds after being off for 8 seconds if testing will continue.

Figure 4:
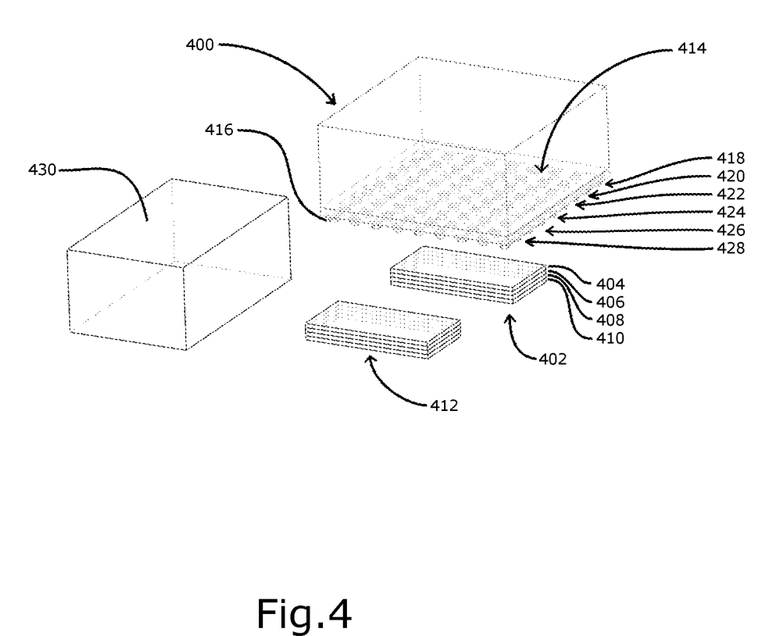
FIG. 4 shows an embodiment of the disclosure with a 4-junction solar cell string, 6 light source type groups and a calibrated full cell.

Another embodiment of the disclosure is illustrated in FIG. 4. The test apparatus 400 is shown. The solar cells under test 402 are a string of 10 upright, lattice-matched, 4-junction solar cells. The top sub-cell 404 of each cell is made of Indium Aluminum Gallium Phosphide, the second sub-cell 406 is Aluminum Gallium Phosphide, the third sub-cell 408 is Gallium Indium Nitrogen Arsenide and the bottom sub-cell 410 is made of Germanium. The wavelengths and energy levels of the band gaps of the sub-cells in each cell are approximately 635 nm (1.95 eV), 855 nm (1.45 eV), 1180 nm (1.05 eV) and 1850 nm (0.67 eV).

This test uses a calibrated full cell 412 for calibration.

The light source array 414 is an array containing approximately 100 light sources in a regular, repeating pattern. There are 6 different light source types, 3 narrow-band LEDs, 1 LED with a broadband phosphor, 1 LED with a nanoparticle coating and 1 blackbody radiating incandescent lamp. The wavelengths of the LEDs are 450 nm, 800 nm and 950 nm. The LED with a phosphor is a 400 nm LED with a phosphor that emits broadband white light in a range from 400 nm to 800 nm. The LED with the nanoparticle coating is an 840 nm LED with a coating that absorbs the 840 nm light and re-emits light at 1250 nm. The incandescent lamps are filaments in a vacuum that emit a blackbody spectrum with a peak above 2000 nm. The narrow band LEDs each have lenses 416 which shapes the output beam viewing half angle to approximately plus or minus 5 to 15 degrees. The lamps and LEDs with phosphor and nanoparticle coatings do not have lenses. A single electronic drive channel drives 2 450 nm LEDs in parallel. A single electronic drive channel drives 2 800 nm LEDs in series. A single electronic drive channel drives 2 950 nm LEDs in series. A single electronic drive channel drives 1 white LED. A single electronic drive channel drives 1 LED with nanoparticle coating. A single electronic drive channel drives 2 circuits in series of 3 lamps in parallel. In this configuration, there are more than one light sources that primarily drive some sub-cells: the 450 nm LED group 418 and the white LED group 420 primarily illuminate the top sub-cell; both sources are adjusted together and treated as a one light source type by the calibration routine. The 800 nm LED group 422 primarily illuminates the $2^{nd}$ sub-cell. The 950 nm LED group 424 primarily illuminates the third sub-cell. The 1250 nm emitting LED with nanoparticle group 426 and the lamp group 428 primarily illuminate the bottom sub-cell; both sources are adjusted together and treated as the one light source type by the calibration routine.

Light sources turn on and stay on for the duration of this test. The spacing between the apparatus and the calibration full cell and test string is approximately 120 mm. The light sources for each light source type are illuminated relative to one another in a pattern that gives relatively even illumination over the test plane for each light source type. The apparatus is positioned to illuminate the calibrated full cell over each location where one cell in the string will be during testing. The solar simulator illuminates the calibrated full cell such that the calibration cell is current limited by the top sub-cell and thus gives top sub-cell calibration current as the output. This current value is measured. The solar cell illumination is changed to give the calibration current of all remaining sub-cells and the current value is measured for all locations for the string. After all calibration sub-cells have been measured in all 10 different locations in the light field, the 40 measured currents are compared to the reference current for the calibration cell and all light sources are adjusted at the same time. This process of measuring the biased, calibration cell in all locations corresponding to all test cell positions and then adjusting all light sources is performed iteratively until each sub-cell in the calibrated cell outputs a current equal to the calibration current to within 0.5%.

The apparatus 400 is moved to illuminate the cells under test 402. The cells under test are attached to a standard source measurement unit 430 and a short circuit current, Isc, measurement is extracted for the solar cell string.

Figure 5:
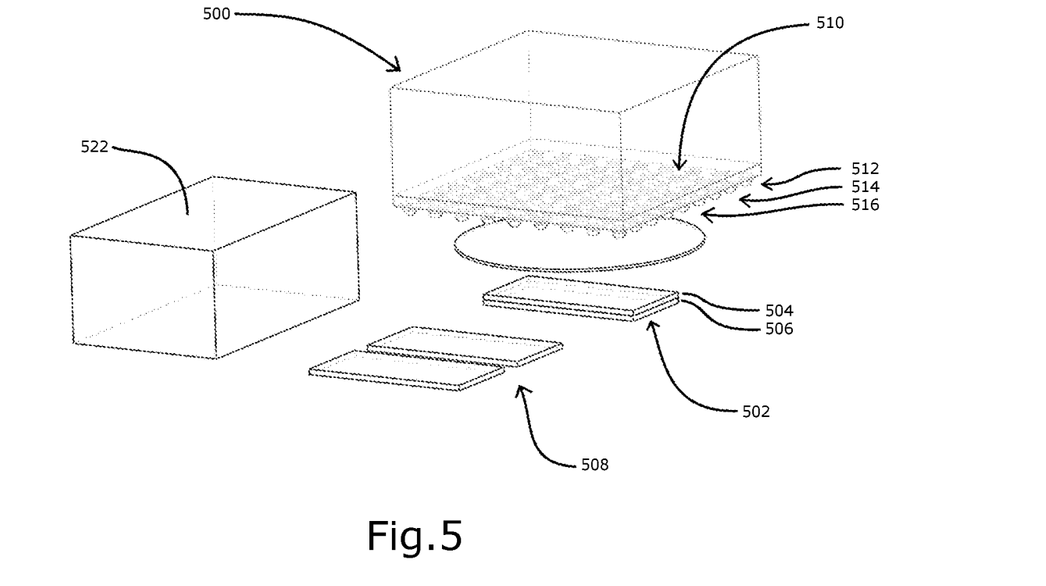
FIG. 5 shows an embodiment of the disclosure with a 2-junction solar cell, 3 light source type groups and 2 calibrated isotypes.

Another embodiment of the disclosure is illustrated in FIG. 5. The test apparatus 500 is shown. The solar cell under test 502 is a dual junction solar using quantum dots. The bulk of the solar cells 504 are Cadmium Telluride and the quantum dots 506 are made of Lead Sulfide. The wavelengths and energy levels of the band gap of the bulk are approximately 825 nm (1.5 eV) and of the quantum dots is approximately 1200 nm (1.05 eV).

This test uses calibrated isotypes 508 for calibration. Before measurement the quantum efficiency of the test cells was measured and an analysis was performed to determine the proper output current for calibration for the isotypes. This current value is used for isotype calibration.

The light source array is an array containing approximately 50 light sources in an irregular pattern. There are 3 different light source type groups, an electroluminescent source group 512, a quartz halogen lamp group 514 and a hot wire, blackbody radiator group 516. The electroluminescent source has a spectral peak at 500 nm. The lamp and the hot wire have peaks above 2000 nm. There is a single, large optic 520 that collects the light from all of the sources into a single beam and directs the light toward the plane containing isotypes and sample. A single electronic channel drives each electroluminescent source. A single electronic channel drives 2 lamps in series. A single electronic channel drives 4 hot-wires in parallel. In this configuration, there are more than one light sources that primarily drive some sub-cells: the electroluminescent source primarily illuminated the bulk sub-cell. The lamp and the hot wire primarily illuminate the quantum dots; both sources are adjusted together and treated as one light source type by the calibration routine.

Light sources turn on and stay on for the duration of this test. The spacing between the apparatus 500 and the test solar cell 502 is approximately 500 mm. Calibration and measurement then proceed in a way similar to the other embodiments.

Figure 6:
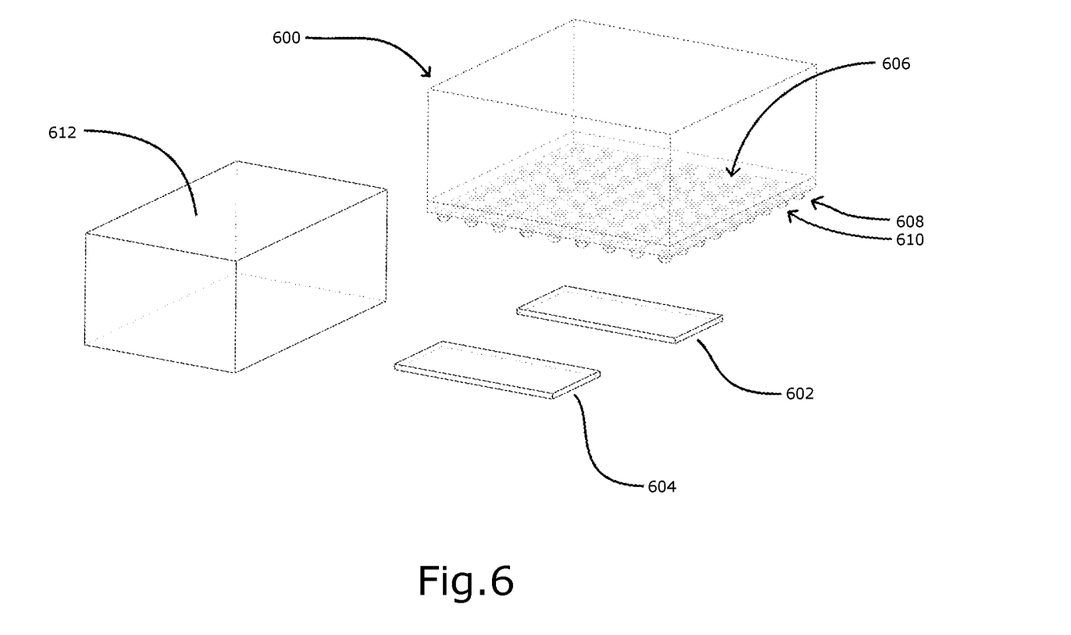
FIG. 6 shows an embodiment of the disclosure with a 2-junction solar cell, 2 light source type groups and a spectrometer.
Figure 7:
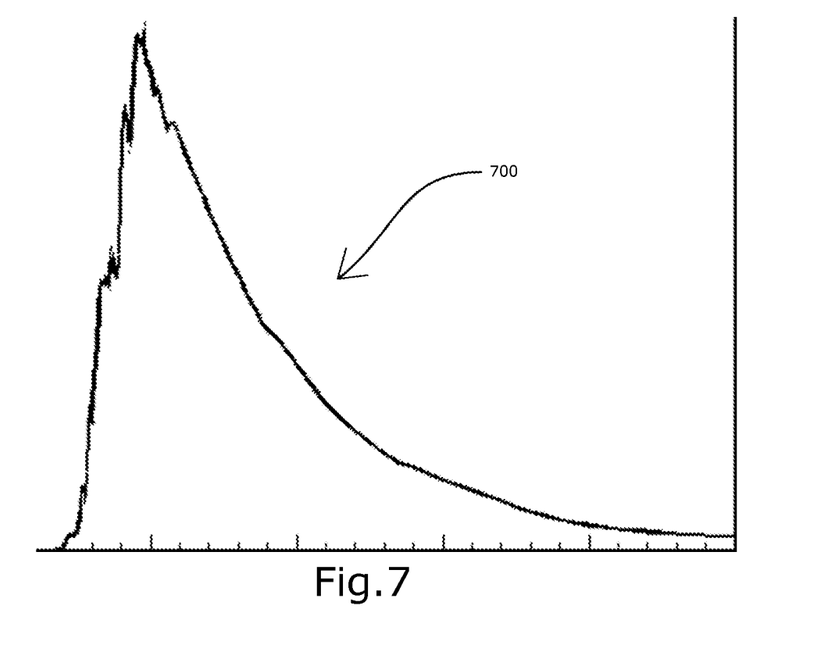
FIG. 7 shows a graph of the AM0 spectrum.
Figure 8:
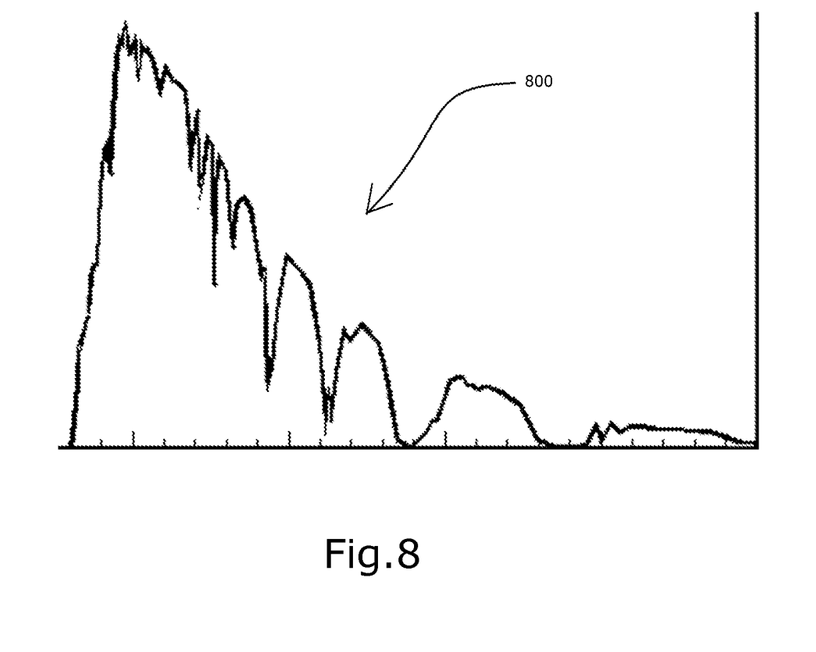
FIG. 8 shows a graph of the AM1.5 spectrum.
Figure 9:
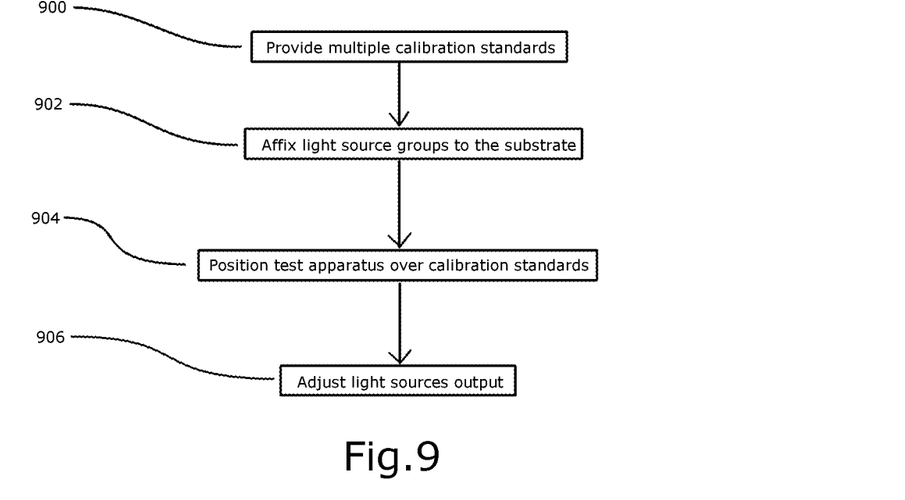
FIG. 9 shows a flow chart of possible operation including measuring the test apparatus with all isotypes, adjusting the illumination and testing the solar cell.
Figure 10:
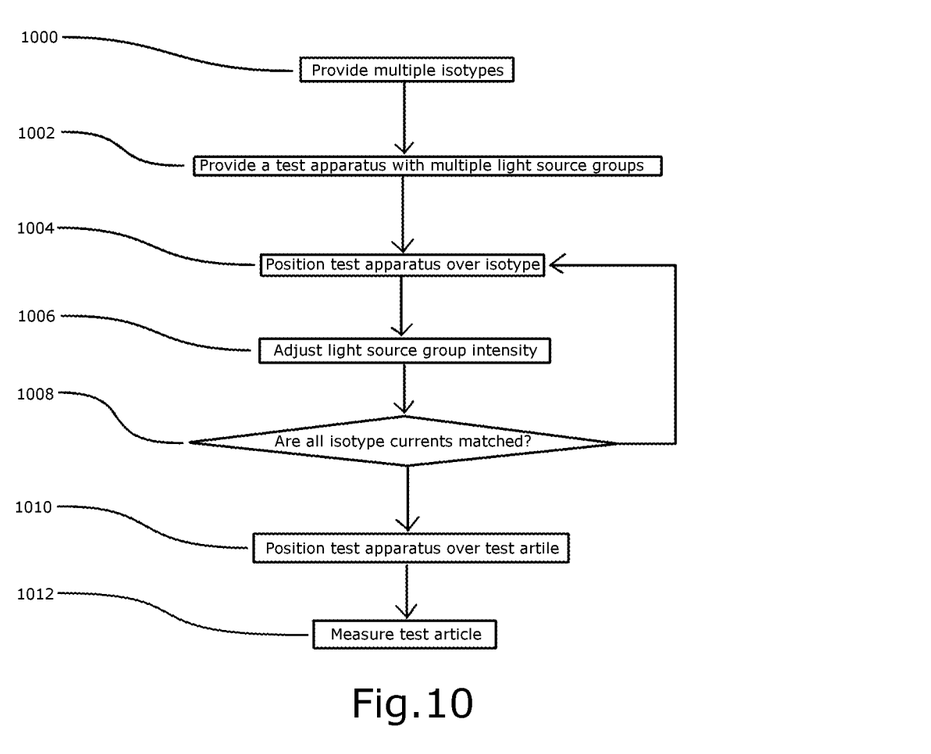
FIG. 10 shows a flow chart of possible operation including moving the test apparatus over each isotypes in series, adjusting the illumination and testing the solar cell.
Figure 11:
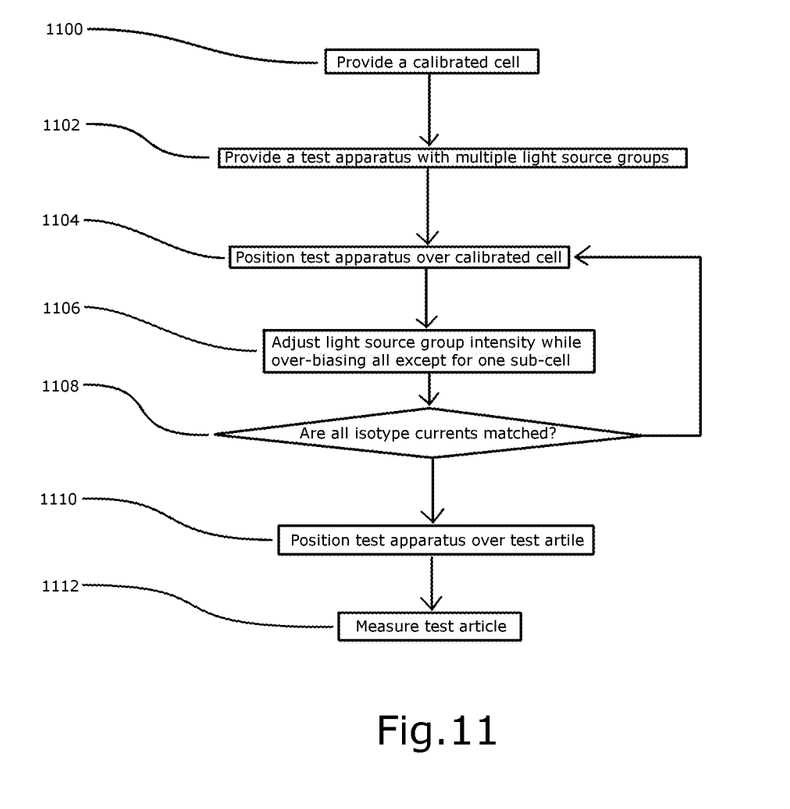
FIG. 11 shows a flow chart of possible operation including adjusting the test apparatus illumination with a calibrated full cell and testing the solar cell.

An additional embodiment of the disclosure is illustrated in FIG. 6. The test apparatus 600 is shown. The solar cell under test 602 is a dual junction polymer solar cell. The first sub-cell is a polymer accepting photons with wavelengths between 350 nm (3.5 eV) and 600 nm (2.1 eV). The second sub-cell is a polymer accepting photons with wavelengths between 600 nm (2.1 eV) and 1000 nm (1.2 eV). In polymer solar cells the sub-cells are intermingled in the polymer rather than being physical layers.

This test uses a spectrometer 604 for calibration. Light from the solar simulator is shown into the spectrometer and the light is adjusted until integrated current match for a theoretical model of the cell under test.

The light source array 606 is an array containing approximately 20 light sources. There are 2 different light source types: laser diodes and miniature Xenon flash lamps. The laser diode group 608 produces 450 nm light and the Xenon flash lamp group 610 has a broad output spectrum. A single electronic channel drives each individual light source. The laser primarily illuminates the first sub-cell and the flash lamp primarily illuminates the second sub-cell.

The light sources turn on for a pulse lasting 5 milliseconds and are off for 800 milliseconds for the duration of this test. Data is collected during the last 3 milliseconds when the light sources are on. The spacing between the apparatus and the isotypes and cells is approximately 1000 mm. The light sources for each light source type are illuminated relative to one another in a pattern that gives relatively even illumination over the test plane for each light source type.

The apparatus 600 is positioned to illuminate the detector of the spectrometer 604 for calibration. Then the apparatus is positioned over the test cell. Calibration and measurement then proceed in a way similar to the other embodiments.

Various implementations of the test apparatus and associated methods of operation have been described above. However, it should be understood that they have been presented by way of example only, and not limitation. Where methods and steps described above indicate certain events occurring in certain order, those of ordinary skill in the art would recognize that the ordering of certain steps may be modified and such modifications are in accordance with the variations of the disclosure. The implementations have been particularly shown and described, but it will be understood that various changes in form and details may be made. Accordingly, other implementations are within the scope of the following claims.

What is claimed is:

1. A test apparatus for analyzing performance of a multi junction solar cell comprising a plurality of sub-cells, the test apparatus comprising:
a substrate; and
a plurality of light source groups, each of the light source groups comprising a plurality of light sources distributed over the substrate; wherein
for each of the light source groups, each of the light sources has a substantially similar light emission spectrum;
the light emission spectrum of the light sources of each light source group is different from that of the light sources of the other light source groups;
the sub-cells of the multi junction solar cell are each configured to be photoexcited by different spectra of light from one another; and
each light source group is configured to primarily photoexcite one of the sub-cells of the solar cell, and the plurality of light source groups are configured such that each sub-cell of the solar cell is photoexcited by at least one of the light source groups during operation of the test apparatus while the test apparatus is positioned over and proximal to the solar cell.

2. The test apparatus of claim 1, further comprising a set of calibration standards, wherein the output power of each of the light source groups during operation of the test apparatus is selected such that when the light sources consecutively illuminate the set of calibration standards, an output current of each of the calibration standards is equal to a predetermined current value.

3. The test apparatus of claim 2, wherein each calibration standard corresponds to one of the sub-cells of the solar cell, and the predetermined current value of each calibration standard is determined by illuminating each calibration standard with a first light source having a first emission spectrum different than that emitted by the test apparatus.

4. The test apparatus of claim 3, wherein the first emission spectrum is the air mass zero spectrum.

5. The test apparatus of claim 3, wherein the test apparatus is configured such that each calibration standard is primarily photoexcited by a single light source group of the plurality of light source groups.

6. The test apparatus of claim 1, wherein the light sources of at least one of the light source groups are LEDs.

7. The test apparatus of claim 6, wherein the light sources of at least one of the light source groups are incandescent lights.

8. A test apparatus for analyzing performance of a solar cell comprising a plurality of sub-cells, the test apparatus comprising:
  a substrate; and
  a plurality of light source groups, each of the light source groups comprising a plurality of light sources distributed over the substrate; wherein
  for each of the light source groups, each of the light sources has a substantially similar light emission spectrum;
  the light emission spectrum of the light sources of each light source group is different from that of the light sources of the other light source groups;
  each light source group is configured to primarily photoexcite one of the sub-cells of the solar cell, and the plurality of light source groups are configured such that each sub-cell of the solar cell is photoexcited by at least one of the light source groups during operation of the test apparatus while the test apparatus is positioned over and proximal to the solar cell;
  the plurality of sub-cells of the solar cell includes a first sub-cell configured to be photoexcited by light having a wavelength less than a first wavelength, a second sub-cell configured to be photoexcited by light having a wavelength less than a second wavelength, and a third sub-cell configured to be photoexcited by light having a wavelength less than a third wavelength; and
  the first wavelength is smaller than the second wavelength, the second wavelength is smaller than the third wavelength, the first sub-cell is on top of the second sub-cell, and the second sub-cell is on top of the third sub-cell.

9. The test apparatus of claim 8, wherein the plurality of light source groups of the test apparatus includes a first light source group comprising LEDs that primarily emit light having a wavelength smaller than the first wavelength, a second light source group comprising LEDs that primarily emit light having a wavelength between the first and second wavelengths, and a third light source group comprising LEDs that primarily emit light having a wavelength between the second and third wavelengths.

10. The test apparatus of claim 1, wherein the substrate comprises a printed circuit board.

11. A method of configuring a test apparatus to analyze performance of a solar cell, the solar cell comprising a plurality of sub-cells, the test apparatus comprising a plurality of light source groups, the method comprising:
  providing a plurality of calibration standards, the number of calibration standards being equal to the number of sub-cells of the solar cell, wherein each of the calibration standards corresponds to one of the sub-cells of the solar cell;
  affixing the plurality of light source groups to a substrate, each of the light source groups comprising at least three light sources distributed over the substrate, the number of light source groups being greater than or equal to the number of calibration standards, wherein for each of the light source groups, each of the at least three light sources has a substantially similar light emission spectrum, and the light emission spectrum of each of the light source groups is different from that of each of the other light source groups;
  causing the test apparatus to be consecutively positioned over each of the calibration standards at a separation in a range of 10 to 2000 millimeters; and
  causing the intensities of the at least three light sources of each of the light source groups to be adjusted such that an output current of each of the calibration standards is within 2% of a predetermined current value while the test apparatus is positioned over each of the calibration standards.

12. The method of claim 11, wherein for each of the calibration standards, the predetermined current value corresponds to a corrected output current of the calibration standard measured while the calibration standard was exposed to air mass zero.

13. The method of claim 11, wherein each of the calibration standards is an isotype corresponding to one of the sub-cells of the solar cell.

14. The method of claim 13, wherein:
  the plurality of calibration standards includes a first isotype, a second isotype, and a third isotype;
  the plurality of light source groups includes a first group of LEDs having an emission spectrum capable of photoexciting a first sub-cell of the first isotype, a second group of LEDs having an emission spectrum capable of photoexciting a second sub-cell of the second isotype, and a third group of LEDs having an emission spectrum capable of photoexciting a third sub-cell of the third isotype.

15. A method of testing a multi junction solar cell optimized to generate power when illuminated by light of a first emission spectrum, the method comprising:
  providing a plurality of isotypes, each isotype corresponding to a different sub-cell of the multi junction solar cell, wherein the number of isotypes is equal to the number of sub-cells of the multi junction solar cell;
  providing a test apparatus, the test apparatus comprising:
    a substrate; and
    a plurality of light source groups, each of the light source groups comprising a plurality of light sources distributed over the substrate, the number of light source groups being greater than or equal to the number of isotypes; wherein
    for each of the light source groups, each of the light sources has a substantially similar light emission spectrum;
    each of the light source groups is configured to primarily excite one of the sub-cells of the multi junction solar cell with which the light source group is associated, and each sub-cell is associated with at least one of the light source groups; and
    an emission spectrum of the test apparatus is substantially different from the first emission spectrum;
  consecutively positioning the test apparatus over each of the isotypes;
  adjusting the intensities of the light sources of each of the light source groups such that an output current of each of the isotypes is within 2% of a predetermined current value; and
  positioning the test apparatus over the multi junction solar cell and measuring a current-voltage characteristic of the multi junction solar cell.

16. The method of claim 15, wherein for each of the light source groups, the adjusting of the intensities of the light sources of the light source group is performed while the test apparatus is positioned over the isotype corresponding to the sub-cell with which the light source group is associated.

17. The method of claim 15, wherein a current-voltage characteristic of each of the isotypes is measured while the test apparatus is positioned over the isotype, and the adjusting of the intensities of the light sources of each of the light source groups is performed after the positioning of the test apparatus over all of the isotypes.

18. The method of claim 15, further comprising after measuring the current-voltage characteristic of the multi junction solar cell, consecutively positioning the test apparatus over each of the isotypes and measuring the output current of each of the isotypes without adjusting the intensities of the light sources of each of the light source groups.

19. A method of configuring a test apparatus to analyze performance of a solar cell, the solar cell comprising a plurality of sub-cells, the test apparatus comprising a plurality of light source groups affixed to a substrate, the number of light source groups being greater than or equal to the number of sub-cells of the solar cell, wherein each of the light source groups comprises at least three light sources distributed over the substrate, and for each of the light source groups each of the at least three light sources has a substantially similar light emission spectrum, the method comprising:

providing a calibrated cell having the same number of sub-cells as the solar cell, wherein each of the sub-cells of the calibrated cell is associated with at least one of the light source groups, and each light source group is configured to primarily photoexcite one of the sub-cells of the calibrated cell;

causing the test apparatus to be positioned over the calibrated cell at a separation in a range of 10 to 2000 millimeters; and for each sub-cell of the calibrated cell, causing the at least three light sources of each of the light source groups associated with the sub-cell to be adjusted to a first illumination level that causes the calibrated cell to output a current that is within 2% of a predetermined current level associated with the sub-cell while all of the other sub-cells of the calibrated cell are simultaneously illuminated by their associated light sources at a second illumination level substantially greater than an illumination level that each of the other sub-cells are configured to receive.

20. The method of claim 19, wherein the second illumination level is sufficiently large to cause the current that is output by the calibrated cell to be limited by the sub-cell associated with the light source groups for which the light sources are illuminated at the first illumination level.

* * * * *